P. R. COVERT & P. A. SNYDER.
Radiator for Steam-Heaters.

No. 212,360. Patented Feb. 18, 1879.

UNITED STATES PATENT OFFICE.

PHILETUS R. COVERT AND PETER A. SNYDER, OF JERSEY CITY, N. J.

IMPROVEMENT IN RADIATORS FOR STEAM-HEATERS.

Specification forming part of Letters Patent No. 212,360, dated February 18, 1879; application filed January 7, 1879.

*To all whom it may concern:*

Be it known that we, PHILETUS R. COVERT and PETER A. SNYDER, of Jersey City, in the county of Hudson and State of New Jersey, have invented certain new and useful Improvements in Radiators; and we do hereby declare that the following is a full, clear, and exact description of the invention, which will enable others skilled in the art to which it appertains to make and use the same, reference being had to the accompanying drawings, and to the letters of reference marked thereon, which form a part of this specification.

Our invention relates to steam-radiators; and it consists particularly in the method of fastening the pipes to the base, and also in the construction and combination of parts, as will be hereinafter more fully set forth, and pointed out in the claims.

Figure 1:
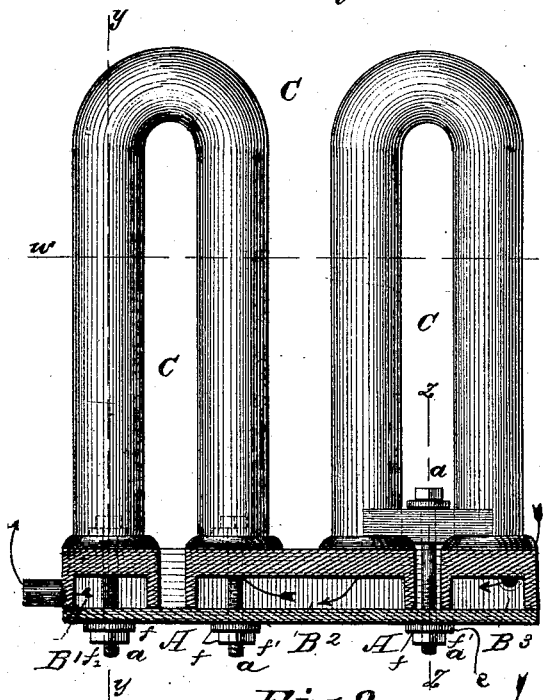
Figure 3:
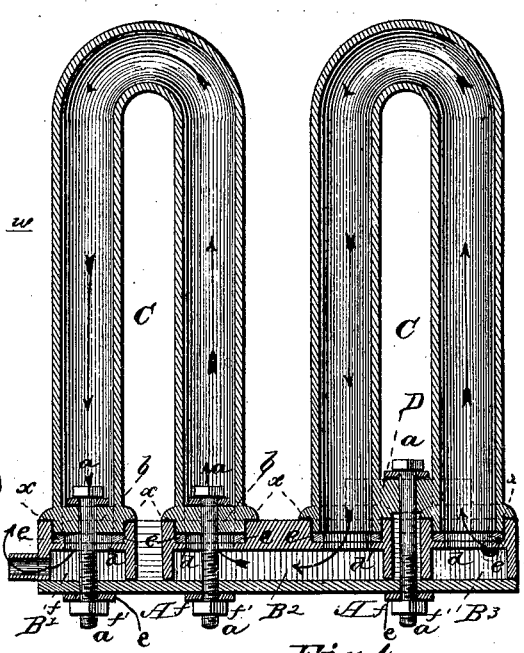
Figure 2:
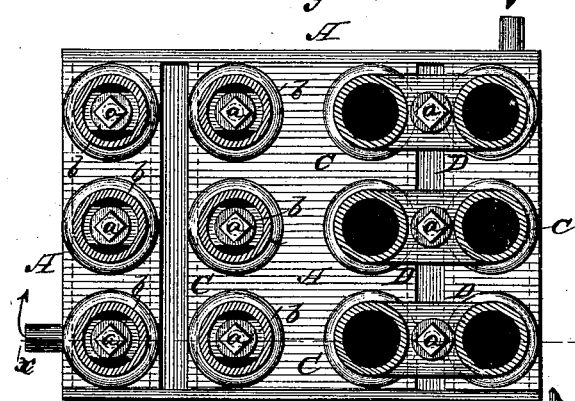
Figure 4:
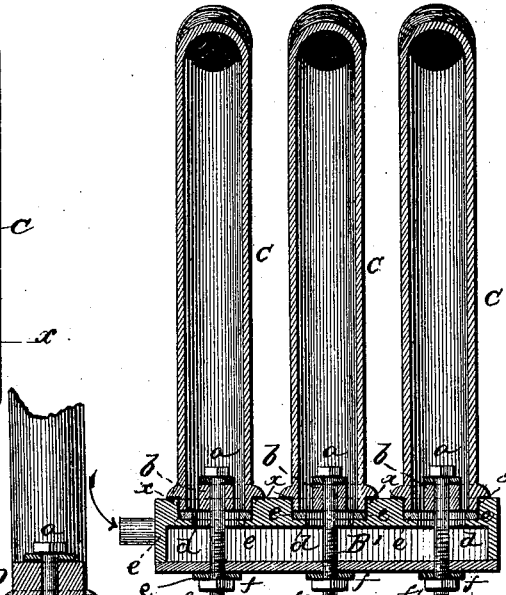
Figure 5:
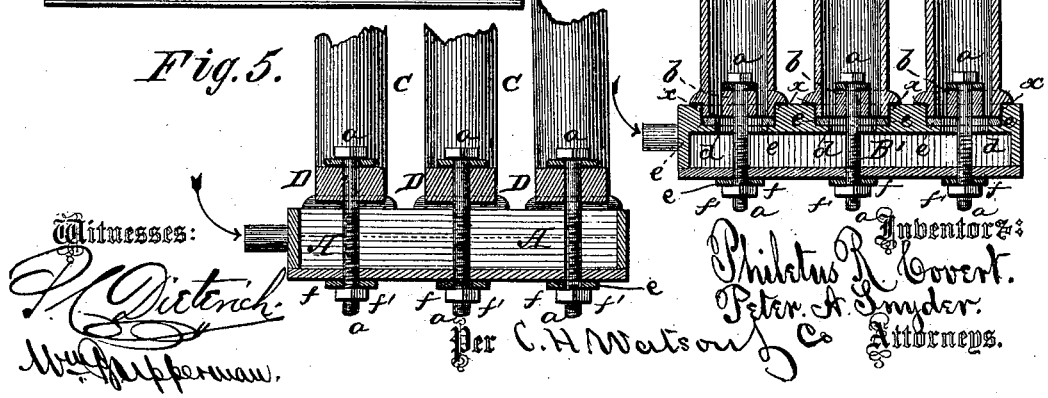

In the annexed drawings, which fully illustrate our invention, Figure 1 is a longitudinal section of the base, showing side elevations of the pipes. Fig. 2 is a horizontal section of the same on the line $w\, w$, Fig. 1. Fig. 3 is a vertical section on the line $x\, x$, Fig. 2, showing side view of the fastening bolts and nuts. Fig. 4 is a vertical section on the line $y\, y$, Fig. 1, showing side view of the fastening bolts and nuts. Fig. 5 is a vertical section on the line $z\, z$, Fig. 1, showing side view of the fastening bolts and nuts.

A represents the base of the radiator, constructed with any desired number of chambers—one, two, or more—but preferably divided, as shown, into three chambers, $B^1\, B^2\, B^3$, when two series of return-pipes are used. C C are the return steam-pipes connecting the chambers of the base. One series of these pipes connects the chamber $B^1$ with the central chamber, $B^2$, and the other series of pipes connects said central chamber with the third chamber, $B^3$, thus making a forced circulation of the steam. The central chamber, $B^2$, is preferably made about twice the size of the other chambers, $B^1$ and $B^3$.

The pipes C are fastened to the base A by means of bolts $a\, a$ at the ends of each pipe by means of a web, $b$, across the end of the pipe, so as to allow the steam to pass on either side.

It will be understood that across each end of each pipe C is cast a web, $b$, through which the bolt $a$ is passed, as shown fully in Figs. 3 and 4.

The ends of the pipes fit in recesses $x\, x$ made in the base, and at the bottom of each recess is an interior circumferential flange, $d$, upon which is placed a washer, $e$, of lead or other suitable material, the end of the pipe resting upon said washer. Similar washers are introduced on the bottom of the base under the nuts $f$ on the ends of the bolts. These washers being made of lead or other suitable yielding material admit of the pipes being drawn down by the nuts $f'$, so as to make steam-tight joints.

The washers $e$, which rest upon the flanges $d$, are entirely inclosed, as shown, and can, therefore, not expand, which would, if permitted, injure the joints and cause leakage.

If it should be considered that the webs $b$ would impede the passage of the steam through the pipes, said web, instead of being within the pipe, may be arranged to connect the ends of the pipe, as shown at D, and a single bolt be passed through said web to connect the pipe to the base, thus leaving the ends of the pipe unobstructed.

Suitable washers will be used in this case, also, to make the joints steam-tight.

Having thus fully described my invention, what I claim as new, and desire to secure by Letters Patent, is—

1. In a radiator composed of a base and one or more series of return steam-pipes, the steam-pipes connected to the base by bolts passing through webs in or between the ends of the pipes and through the base, and the joints packed with washers, substantially as herein set forth.

2. In a radiator composed of a base and one or more series of return-pipes, a web formed at the lower end of each pipe with a bolt passing through said web and through the base, with a nut on the end of the bolt for connecting the pipe to the base, substantially as set forth.

3. The combination, with the base A, of the return-pipes C, having webs $b$ or D, the bolts $a$, washers $e$, and nuts $f$, substantially as and for the purposes herein set forth.

4. In a radiator, the base A, divided into the chambers $B^1$ $B^2$ $B^3$, in combination with the steam-pipes C, fitting in recesses thereon, and secured by bolts passing through webs, substantially as and for the purposes herein set forth.

In testimony that we claim the foregoing as our own we have hereto affixed our signatures in presence of two witnesses.

PHILETUS R. COVERT.
    PETER A. SNYDER.

Witnesses:
 LUTHER S. ELMER,
 WALTER J. BRADY.